United States Patent [19]

Kawamura et al.

[11] Patent Number: 4,833,887
[45] Date of Patent: May 30, 1989

[54] AUXILIARY APPARATUS FOR A TURBOCHARGED INTERNAL COMBUSTION ENGINE

[75] Inventors: Hideo Kawamura, Samukawa; Katsuyuki Tamai, Yokohama; Shigeki Saito, Katsuta; Toshihiro Yamanaka, Hoya, all of Japan

[73] Assignees: Isuzu Motors Limited; Hitachi, Ltd., both of Tokyo, Japan

[21] Appl. No.: 901,150

[22] Filed: Aug. 28, 1986

[30] Foreign Application Priority Data

Aug. 28, 1985 [JP] Japan .................................. 60-188826
Aug. 28, 1985 [JP] Japan .................................. 60-188827

[51] Int. Cl.⁴ ............................................. F02B 37/00
[52] U.S. Cl. ................................. 60/608; 290/40 C; 290/52
[58] Field of Search ................... 60/607, 608; 290/52

[56] References Cited

U.S. PATENT DOCUMENTS

| | | | |
|---|---|---|---|
| 3,869,866 | 3/1975 | Timoney | 60/607 |
| 4,680,933 | 7/1987 | Bozung et al. | 60/608 |
| 4,757,686 | 7/1988 | Kawamura et al. | 60/608 |

FOREIGN PATENT DOCUMENTS

| | | |
|---|---|---|
| 0079100 | 5/1983 | European Pat. Off. |
| 0159146 | 10/1985 | European Pat. Off. |
| 2206450 | 8/1973 | Fed. Rep. of Germany |
| 2808147 | 8/1979 | Fed. Rep. of Germany |
| 2951136 | 6/1981 | Fed. Rep. of Germany |
| 2183337 | 12/1973 | France |
| 101540 | 6/1984 | Japan |
| 141711 | 8/1984 | Japan |
| 800263 | 8/1958 | United Kingdom |

*Primary Examiner*—Michael Koczo
*Attorney, Agent, or Firm*—Staas & Halsey

[57] ABSTRACT

Intake and exhaust ports of an internal combustion engine possess respective turbine impellers, and an electrical rotary machine is formed on a rotary shaft connecting the impellers. Sensors are provided for sensing the loaded state of the engine at all times based on engine rpm and the amount of fuel supplied to the engine. When the engine is overloaded, the electrical rotary machine is made to operate as a motor to assist in the supercharging of the engine. When the engine load is not excessive, the rotary machine is made to operate as a generator to charge surplus energy, derived from the engine exhaust, in a storage battery.

10 Claims, 3 Drawing Sheets

AUXILIARY APPARATUS FOR A TURBOCHARGED INTERNAL COMBUSTION ENGINE

BACKGROUND OF THE INVENTION

This invention relates to an auxiliary apparatus for an internal combustion engine. More particularly, the invention relates to a motor-generator arranged on the turbine shaft of a supercharger in an internal combustion engine, and to control of the motor-generator.

A vehicle that relies upon an internal combustion engine is equipped with a large number of electrical devices. These include a starting motor, an ignition device, alarms, various lighting equipment such as the vehicle headlights, various indicators and the like. The vehicle is provided with a secondary or storage battery as a power supply for these devices, and with a generator driven by the internal combustion engine for the purpose of charging the battery. Vehicles now come equipped with a number of newly developed electrical devices in addition to the equipment mentioned above. All of these devices result in a great amount of power consumption.

To replenish the power consumed by these devices, the battery is charged by the generator, which is driven by the output of the internal combustion engine. However, since the energy involved is rotational energy applied to the generator from the engine crankshaft by way of a V belt, a portion of the net output of the engine is consumed as electric power by the electrical devices.

Furthermore, a size limitation is placed upon the external dimensions of the generator because of the engine layout, as a result of which the maximum power is limited to about 700 W at 24 V. It is quite probable that this will not be sufficient to cope with the power consumption of the many electrical devices expected to be added to vehicles in the future.

Vehicles now come equipped with a supercharger in which a turbine is driven by utilizing the energy possessed by exhaust gas and the engine cylinders are supercharged with air by means of a compressor operatively associated with the turbine, whereby the fuel is burned more efficiently. However, since the exhaust gas has but little energy when the internal combustion engine is running at low speed, supercharging pressure is low and the filling efficiency is poor. The result is an insufficient increase in output and torque.

SUMMARY OF THE INVENTION

An object of the present invention is to provide an auxiliary apparatus for an internal combustion engine in which, when the battery is charged, there is no consumption of the net output of the engine, thus making it possible to deal with an anticipated increase in power consumption, and in which an improvement is achieved in torque generation at low speeds.

Another object of the present invention is to provide an auxiliary apparatus for an internal combustion engine, in which the rotary shaft of a supercharger is provided with an electrical rotary machine that operates as a motor or generator as the occasion demands.

A further object of the present invention is to provide a control unit for causing the electrical rotary machine to operate as the motor or generator in the internal combustion engine auxiliary apparatus of the above-described configuration.

According to the present invention, the foregoing objects are attained by providing an auxiliary apparatus of an internal combustion engine, the auxiliary apparatus comprising a turbine driven by exhaust gas, and a compressor coupled to the turbine via a shaft and driven by the turbine. The auxiliary apparatus includes means for generating a signal upon sensing the load of the internal combustion engine, and means for generating a signal upon sensing the rotational speed of the internal combustion engine.

Further, according to the present invention, there is provided a control unit for controlling an auxiliary apparatus of an internal combustion engine, the auxiliary apparatus comprising a turbine driven by exhaust gas, and a compressor coupled with the turbine via a shaft and driven by the turbine. The control unit includes a motor-generator provided on the shaft of the turbine, means for sensing the load of the internal combustion engine and for generating a signal indicative of the load sensed, means for sensing the rotational speed of the internal combustion engine and for generating a signal indicative of the rotational speed sensed, and means responsive to the two generated signals for controlling the motor-generator so that the motor-generator will operate as a generator.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Preferred embodiments of the present invention will now be described in detail with reference to the drawings.

Figure 1:
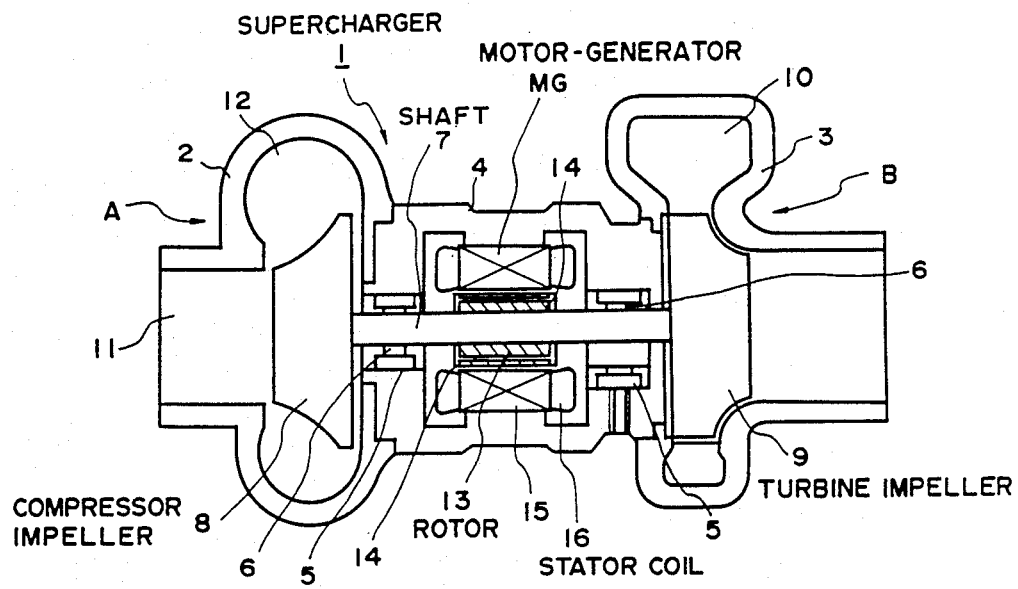
FIG. 1 is a side view showing the construction of an embodiment of the present invention.

With reference to FIG. 1, there is shown a supercharger 1 which includes a compressor A provided at a point along an intake pipe of an internal combustion engine, a turbine B provided at a point along an exhaust pipe of the internal combustion engine, a compressor housing 2, a turbine housing 3, and a center housing 4. The center housing 4 has a core portion the two ends of which are each provided with a fixed bearing 5 and a floating metal 6 that rotates in sliding fashion within the fixed bearing 5. A shaft 7 is rotatably supported at both ends by the floating metals 6.

A compressor impeller 8 is mounted on one end of the shaft 7, and a turbine impeller 9 is mounted on the other end thereof. The impellers 8, 9 are accommodated within the compressor housing 2 and turbine housing 3, respectively The turbine impeller 9 is rotated by energy possessed by exhaust gas fed into a scroll 10 and rotates the compressor impeller 8 via the shaft 7. Air introduced from an intake pipe 11 undergoes a pressure conversion within a diffuser 12 and is fed under pressure into the cylinders of the internal combustion engine.

A rotor 13 constituting a so-called squirrel-cage rotor is arranged on the shaft 7 near its central portion and is penetrated by a plurality of axially extending conductors in the vicinity of axially stacked silicon steel plates, the conductors being short circuited to conductor plates 14 provided at both ends.

A stator core 15 opposes the rotor 13 and has a stator coil 16 constituting a winding for producing a predetermined rotating field. Accordingly, the rotor 13 is provided with a rotating force by an AC current supplied to the stator coil 16, thereby rotating the shaft 7. When the shaft 7 is rotated due to application of high-speed rotation greater than the synchronized speed produced by the alternating current, the rotor 13, stator core 15 and stator coil 16 form an induction generator, so that an electromotive force can be obtained from the stator coil 16. Accordingly, the electrical rotary machine comprising the rotor 13, stator core 15 and stator coil 16 constitutes a motor-generator MG.

Figure 2:
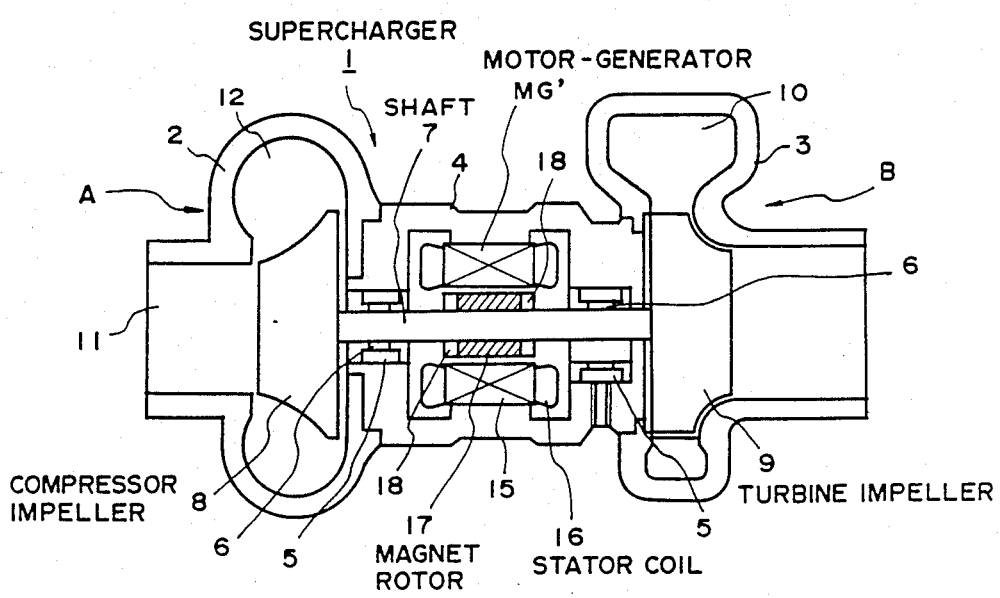
FIG. 2 is a side view showing the construction of another embodiment of the invention.

FIG. 2 is a side view showing the construction of another embodiment of an internal engine supercharger according to the present invention. Numeral 17 denotes an axially elongated ring-shaped magnet rotor comprising a magnetic body including a rare earth element and having a large residual magnetism. The magnet rotor 17 is arranged on the shaft 7 near its central portion and is fixedly held at both end faces by metal disks 18 having a high tensile strength. Carbon fibers are wound tightly around the outer periphery of the magnetic rotor 17 to provide the rotor with a high degree of durability so that it may withstand the centrifugal force and vibration produced by ultraspeed rotation.

The stator core 15 is arranged to oppose the magnet rotor 17 and produces an electromotive force in the stator coil 16 through induction caused by a change in flux produced by rotation of the magnet rotor 17.

Accordingly, when the shaft 7 is rotated by an external force, the electrical rotary machine constituted by the magnet rotor 17, stator core 15 and stator coil 16 acts as a generator in which the stator coil 16 produces an alternating current due to the change in flux caused by rotation of the magnet rotor 17. When AC power is supplied to the stator coil 16, the electrical rotary machine machine acts as a motor in which the magnet rotor 17 rotates. Thus, the AC machine constitutes a motor-generator MG'.

Figure 3:
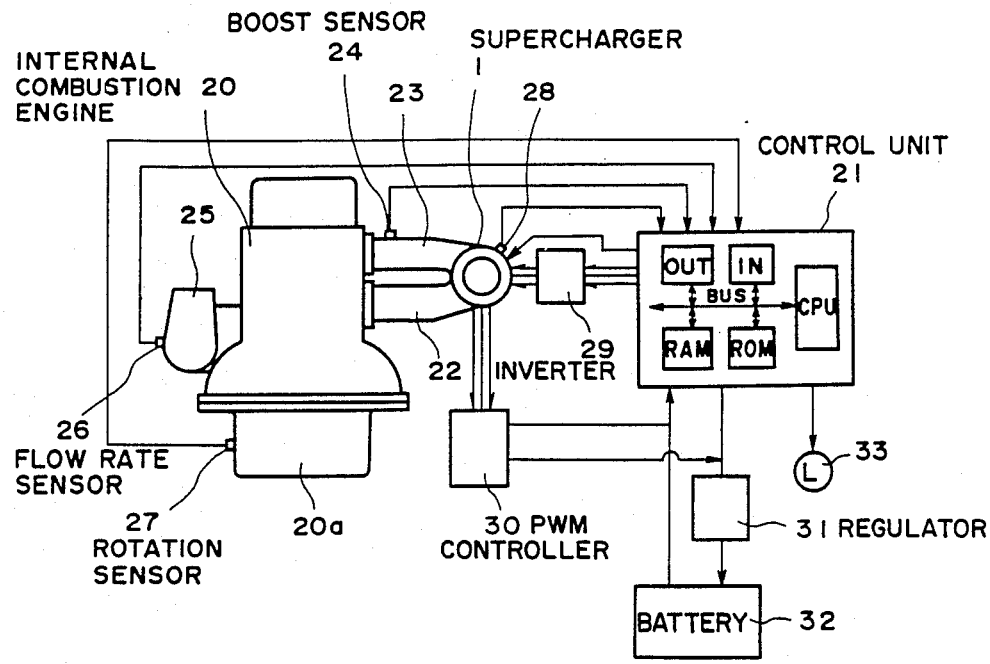
FIG. 3 is a block diagram illustrating the relationship between an internal combustion engine using a supercharger and a control unit.

FIG. 3 is a block diagram showing the relationship between an internal combustion engine 20 equipped with the above-described supercharger 1, and a control unit 21. In FIG. 3, an exhaust manifold 22 communicates with an exhaust port of the internal combustion engine 20 and the scroll 10 of the supercharger 1. An intake manifold 23 provides the cylinders with supercharged air fed under pressure by the compressor impeller 8 of the supercharger 1. The intake manifold 23 is provided at a point along its length with a boost sensor 24 serving as means for sensing the boost pressure of the supercharged air and delivering a signal to the control unit 21 in order to sense the intake pressure of the internal combustion engine. An injector 25 is provided on the body of the internal combustion engine 20 and is equipped with a fuel flow rate sensor 26 serving as means for sensing the fuel injection rate of the injector 25 in order to sense the load of the engine. The sensor 26 provides the control unit 21 with a signal indicative of the sensed fuel flow rate.

The internal combustion engine 20 has a crankcase 20a provided with a rotation sensor 27 for sensing the rotational speed of the crank and providing the control unit 21 with a signal indicative thereof. The motor-generator MG is provided with a rotor position sensor 28. At power generation when the magnet rotor 13 or 17 is rotating at high speed, the flux cutting the stator coil 16 is disturbed and there is a reduction in the power-factor of the electromotive force. In order to prevent this, the rotor position sensor 28 delivers an output signal to the control unit 21, which responds by controlling the phase of the electromotive force from the stator coil 16 to improve the power-factor of power generation at high-speed rotation.

The control unit 21 comprises a processor (CPU) for executing processing, a read-only memory (ROM) storing the program for controlling the motor-generator MG and an inverter 29, described below, an input port, an output port, a random-access memory (RAM) for storing the results of processing as well as other data, and an address bus (BUS) interconnecting these components. The boost sensor 24, fuel flow rate sensor 26, rotation sensor 27 and rotor position sensor 28 are connected to the input port, which receives the output signals produced by these sensors. The motor-generator MG, the inverter 29, a pulse width modulation (PWM) controller 30 and a regulator 31 are connected to the output port, which outputs signals for controlling these components.

The inverter 29 is supplied with direct current from a battery 32 via the control unit 21 and converts the current into an alternating current so that the motor-generator MG will operate as a motor. The inverter 29 also rotates the shaft 7 to assist in the supercharging operation of the compressor impeller 8 rotated by the exhaust energy. The arrangement is such that this assisting operation is controlled by the output frequency and output voltage of the inverter 29 in accordance with a command from the control unit 21.

The PWM controller 30 receives the generated power produced when the motor-generator MG operates as the generator and functions to control the voltage of this power to a predetermined valve. The power whose voltage has been controlled to predetermined value is matched to the voltage 32 by the regulator 31 so that the battery 32 will be charged. The control unit 21 is provided with a lamp 33 which lights when the battery 32 is not sufficiently charged.

Figure 4:
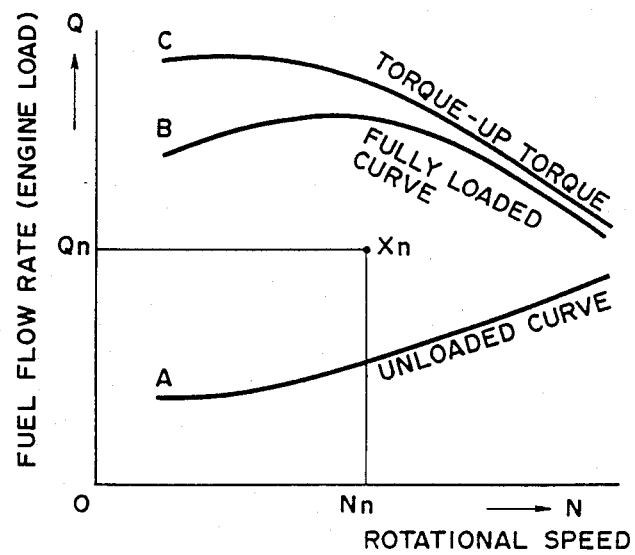
FIG. 4 is a graph showing shows curves indicating the relationship between fuel flow rate, which is indicative of the load of an internal combustion engine, and engine rpm.

FIG. 4 shows curves indicating the relationship between fuel flow rate Q, which is indicative of the load on the internal combustion engine, and the rotational speed N of the engine. A is a curve indicating an unloaded state, B is a curve showing the fully loaded state, and C is a torque-up curve. By way of example, let the fuel flow rate be Qn, and let the rotational speed be Nn. In such a case, a point Xn is obtained between the unloaded curve A and the fully loaded curve B and indicates a partially loaded region of the internal combustion engine.

Let us now describe the operation of the embodiment having the arrangement shown in FIG. 3. Assume that the engine 20 is supplied with fuel by the injector 25 at the flow rate Qn, and that the rotational speed of the engine 20 is Nn. Under these conditions, the control unit 21 receives a signal from the fuel flow rate sensor 26 indicative of Qn, and a signal from the rotation sensor 27 indicative of Nn. In response to the signals indicative of Qn, Nn, the control unit 21 goes to its ROM to sense that the internal combustion engine 20 is in the partially loaded region between the unloaded curve A and the fully loaded curve B, and, based upon this fact, causes the motor-generator MG to operate as the generator. The power from the stator coil 16 produced as a result of rotation of the magnet rotor 13 or 17 is delivered to the PWM controller 30, which proceeds to control this power to a predetermined voltage value. The regulator 31 matches this voltage to that of the battery 32 so that the latter is charged. If the magnet rotor 13 or 17 is rotated at ultraspeed during power generation, the generated power takes on a high frequency and a large phase difference develops between the voltage and current, as a result of which the power-factor declines. However, the rotor position sensor 28 senses this phase difference and provides the control unit 21 with a corresponding signal, whereby the control unit 21 controls the current flowing through the windings of the stator coil 16 to diminish the phase difference and improve the power-factor.

Next, assume that the amount of fuel supplied to the internal combustion engine 20 increases so that the operating region lies between the fully loaded curve B and the torque-up curve C shown in FIG. 4. The fuel flow rate sensor 26 and rotation sensor 27 provide the control unit 21 with the corresponding signals. In response, the control unit 21, in accordance with the control program for the motor-generator MG stored in the ROM, executes control in such a manner that the motor-generator MG operates as the motor. Further, based on output signals from the fuel flow rate sensor 26, rotation sensor 27 and boost sensor 24, the control unit 21 controls the output frequency and voltage of the inverter 29 in accordance with a control map stored in the ROM, so that the stator coil 16 is provided with power to assist in the supercharging operation of the compressor impeller 8. The motor-generator MG thus operates as a motor so as to obtain the optimum boost pressure. Though the exhaust gas energy rises and the driving force of the turbine impeller 9 increases as a result of the foregoing series of operations, the control unit 21 exercises control in such a manner that a predetermined upper limit of the boost pressure is not exceeded. In other words, when the boost pressure reaches its upper limit, the motor-generator MG operates as the generator so that the mechanical power can be absorbed. If the boost pressure has not reached a predetermined value even when the motor-generator MG operates as the motor and the supercharging operation of the compressor impeller 8 is assisted, the output frequency and output voltage of the inverter 29 are controlled in such a manner that the output of the motor will rise, thereby supplying the stator coil 16 with electric power.

Figure 5:
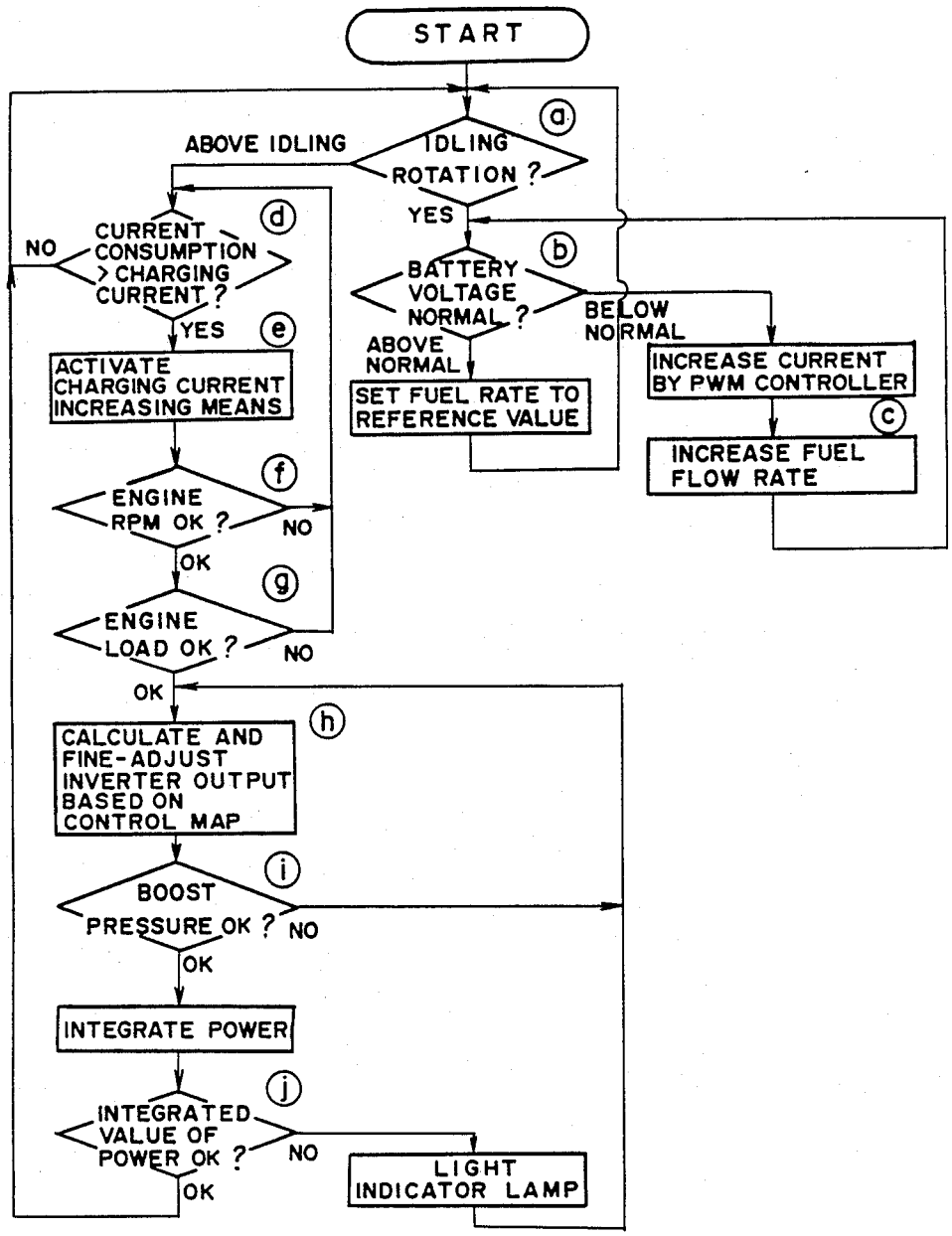
FIG. 5 is a processing flowchart for the processing performed according to the invention.

FIG. 5 is a processing flow chart illustrating an example of processing according to the present embodiment. In the flowchart, an initial step a calls for the rotational speed to be checked based on a signal from the rotation sensor 27. If the rotational speed has attained a predetermined idling rpm, the program proceeds to a step b, which calls for the battery voltage to be checked. If the battery voltage is found to be normal or to have a value above a predetermined value, charging is unnecessary. As a result, the fuel flow rate is held at a reference value and the program returns to the step a.

If the battery voltage is found to be below the predetermined voltage value at the step b, the power from the motor-generator MG operating as the generator is controlled in such a manner that the charging current is increased by the PWM controller 30, thereby charging the battery 32 via the regulator 31. Since the load on the motor-generator MG is increased due to the charging power, the fuel flow rate is raised to increase the energy of the exhaust gas (step c).

If the predetermined idling rpm is exceeded at step a, the current consumed by the battery 32 and the charging current are compared at a step d. If the charging current is determined to be inadequate, then the PWM controller 30, which is a means for increasing the charging power from the motor-generator MG, is controlled and the fuel flow rate is raised to increase the charging current (step e). This is followed by a step f, at which it is determined based on the signal from the rotation sensor 27 whether the internal combustion engine is running at the predetermined rpm, and by a step g, at which the state of the load is checked based on the signal from the fuel flow rate sensor 26. If the answers at both steps are affirmative, the program proceeds to a step h.

At step h, the control unit 21 executes control in accordance with the control map within its ROM based on signals from the fuel flow rate sensor 26, rotation sensor 27 and boost sensor 24. For the region between the fully loaded curve B and torque-up curve C, the control unit 21 calculates an output for the inverter 29 and controls the inverter 29 in such a manner that the motor-generator MG will operate as the motor. Next, the output signal of the boost sensor 24 is checked at a step i. If the boost pressure is of a predetermined value, then an integrated value of the charging power is calculated. This value is checked at a step j. The integrated value of the power is checked as a way of monitoring excessive discharge of the battery 32. This is necessary because the supply of the charging current to the battery 32 is terminated while the motor-generator MG is operating as the motor. If an affirmative decision (OK) is rendered at the step j, the program returns to the initial step a. If the result of checking the integrated value of power indicates that the battery 32 will be discharged excessively, the lamp 33 is lit and the program returns to step h. Accordingly, fine adjustment processing is performed based on the control map and the motor-generator MG is operated as the generator to charge the battery 32.

Note that if the result of checking the boost pressure at the step i indicates that the predetermined value has not been obtained, then the program returns to step h in order that a recalculation can be made.

In the illustrated embodiment, the injector 25 is provided with the fuel flow rate sensor 26 as means for sensing the load on the internal combustion engine. However, it is also possible to sense the load by a sensor which senses the amount of accelerator pedal depression, or, depending on the type of engine, by a sensor which senses the position of a fuel injection quantity rack in a Diesel engine or by a carburetor intake valve opening sensor in a gasoline engine.

As many apparently widely different embodiments of the present invention can be made without departing from the spirit and scope thereof, it is to be understood that the invention is not limited to the specific embodiments thereof except as defined in the appended claims.

What we claim is:

1. Auxiliary apparatus for an engine coupled to a battery for storing and supplying electric power, and having an intake pipe, an exhaust pipe and a supercharger, with a rotary shaft, provided on the engine, said apparatus comprising:
- a first impeller provided in the intake pipe of the engine at a point along the intake pipe and coupled to the rotary shaft;
- a second impeller provided in the exhaust pipe of the engine at a point along the exhaust pipe and connected directly to the rotary shaft;
- an electrical rotary machine coupled to the battery and the rotary shaft, including:
  - a rotor coupled to the rotary shaft; and
  - a stator positioned about an outer periphery of said rotor;
- means for detecting the voltage of the battery;
- means for sensing an amount of fuel supplied to the engine;
- means for sensing a rotational speed of the engine;
- means for sensing a loaded state of the engine based on the amount of fuel supplied and the rotational speed of the engine, and for generating a sensing signal;
- first means for controlling said electrical rotary machine so that said electrical rotary machine receives electric power supplied by the battery and operates as a motor when the load on the engine is determined to be greater than a predetermined value based on the sensing signal from said loaded state sensing means;
- second means for controlling said electrical rotary machine so that said electrical rotary machine operates as a generator to provide electric power for storage by the battery when the load on the engine is determined to be smaller than the predetermined value based on the sensing signal from said loaded state sensing means;
- third means for controlling said electrical rotary machine so that said electrical rotary machine operates as a generator when the rotational speed of the engine is at least a predetermined idling rpm and the voltage of the battery detected by said voltage detecting means is lower than a predetermined voltage; and
- means for increasing the amount of fuel supplied to the engine when said electrical rotary machine is controlled to operate as a generator by said third means.

2. An apparatus according to claim 1, wherein said electrical rotary machine is an induction motor, and wherein said rotor is a squirrel-cage rotor.

3. An apparatus according to claim 1, wherein said electrical rotary machine is an AC electrical rotary machine, and wherein said rotor is a magnet rotor.

4. An apparatus according to claim 3, further comprising means for sensing rotation of said electrical rotary machine and for generating a rotation sensing signal, wherein said electrical rotary machine is subjected to optimum control as a motor based on the rotation sensing signal.

5. An apparatus according to claim 1, further comprising means for sensing rotation of said electrical rotary machine and for generating a rotation sensing signal, wherein said electrical rotary machine is subjected to optimum control as a generator based on the rotation sensing signal.

6. A supercharger for an engine coupled to a battery for storing and supplying electric power and having an intake pipe and an exhaust pipe, comprising:
- a first impeller positioned in the intake pipe of the engine;
- a second impeller positioned in the exhaust pipe of the engine;
- a rotary shaft coupled to said first and second impellers;
- an electrical rotary machine coupled to the battery and the rotary shaft, said electrical rotary machine capable of operating as a motor or a generator;
- means for detecting the voltage of the battery;
- means for controlling said electrical rotary machine so that said electrical rotary machine receives electric power supplied by the battery and operates as a motor when a load on the engine is determined to be greater than a first predetermined value, and for controlling said electrical rotary machine so that said electrical rotary machine operates as a generator to provide electric power for storage by the battery when the engine is determined to be partially loaded because the load is determined to be smaller than a second predetermined value, and when the voltage of the battery detected by said voltage detecting means is less than a predetermined voltage and the rotational speed of he engine is at least a predetermined idling rpm, said controlling means increasing the amount of fuel to be supplied to the engine when said electrical rotary machine is controlled to operate as a generator.

7. A supercharger according to claim 6, wherein said controlling means comprises:
- means for sensing an amount of fuel supplied to the engine;
- means for sensing a rotational speed of the engine; and
- means for sensing a loaded state of the engine, based on the amount of fuel supplied and the rotational speed of the engine, and for generating a sensing signal which indicates the load on the engine,
- wherein said controlling means controls said electrical rotary machine to operate as a motor or a generator based on the sensing signal.

8. A supercharger according to claim 7, wherein said electrical rotary machine comprises:
- a rotor coupled to said rotary shaft; and
- a stator positioned about the outer periphery of said rotor.

9. A supercharger according to claim 8, wherein said electrical rotary machine is an induction motor, and wherein said rotor is a squirrel-cage rotor.

10. An apparatus according to claim 8, wherein said electrical rotary machine is an AC electrical rotary machine, and wherein said rotor is a magnetic rotor.

* * * * *

UNITED STATES PATENT AND TRADEMARK OFFICE
CERTIFICATE OF CORRECTION

PATENT NO. : 4,833,887
DATED : MAY 30, 1989
INVENTOR(S) : HIDEO KAWAMURA ET AL.

It is certified that error appears in the above-identified patent and that said Letters Patent is hereby corrected as shown below:

Col. 2, line 40, delete "shows";
line 67, "respectively The" should be --respectively. The--.

Col. 4, line 46, after "to" insert --the--;
line 47, "voltage 32" should be --voltage of the battery 32--.

Col. 5, line 66, delete "the" (second occurrence);
line 68, delete "the" (first occurrence).

Col. 8, line 32, "of he" should be --of the--.

Signed and Sealed this

Third Day of April, 1990

Attest:

HARRY F. MANBECK, JR.

*Attesting Officer*  *Commissioner of Patents and Trademarks*